United States Patent [19]

Ware et al.

[11] Patent Number: 4,599,731

[45] Date of Patent: Jul. 8, 1986

[54] EXPLODING CONDUCTING FILM LASER PUMPING APPARATUS

[75] Inventors: Kenneth D. Ware, San Diego, Calif.; Claude R. Jones, Los Alamos, N. Mex.

[73] Assignee: The United States of America as represented by the United States Department of Energy, Washington, D.C.

[21] Appl. No.: 604,686

[22] Filed: Apr. 27, 1984

[51] Int. Cl.$^4$ ............................................. H01S 3/091
[52] U.S. Cl. .................................... 372/77; 372/92; 372/87; 372/7
[58] Field of Search ..................... 372/69, 70, 77, 76, 372/55, 61, 7, 87, 92, 88

[56] References Cited

U.S. PATENT DOCUMENTS

| | | | |
|---|---|---|---|
| 3,646,471 | 2/1971 | Dement | 372/77 |
| 4,087,764 | 5/1978 | Young | 372/7 |
| 4,155,052 | 5/1979 | Osche et al. | 372/88 |
| 4,318,060 | 3/1982 | Davis | 372/55 |

OTHER PUBLICATIONS

Lakutin et al., "Initial Stage of a Laminar Pulsed Discharge", Sov. Phys. Tech. Phys. 25, 1980.
Jones et al. "Optically Pumped Ultraviolet and Infrared Lasers Driven by Exploding Metal Films and Wires", Proc. L.A. Conf. on Opt. SPIE V380, p. 60, 11/21/83.
Jones et al., "High Energy Ultraviolet I$_2$ Laser", AIP Con. Proc. No. 100, Excimer Lasers 1983, p. 116, Jun. 27, 1983.
Dvornikov et al., "Layered Pulsed Discharge as a Light Source", Zhur. Prik. Spek. 21 (227), 1974.
Lakutin et al, "Structure and Emission of a Stratified Pulsed Discharge", Sov. Phys Tech. Phys. 23, 1020, 1978.
Lavrentyuk et al., "Stratified Pulsed Discharge with Limited Surface Area", Sov. Phys. Tech. Phys. 24, 1186, 1979.
Lakutin et al., "Microsecond Stratified Pulsed Discharge", Sov Phys Tech. 24, 1191, 1979.
Jones et al., "High Energy UV I$_2$ Laser", AIP Conf. Proc. No. 100, Opt. Sci. & Eng. No. 3, 1983.

Primary Examiner—Léon Scott, Jr.
Attorney, Agent, or Firm—Samuel M. Freund; Paul D. Gaetjens; Judson R. Hightower

[57] ABSTRACT

Exploding conducting film laser optical pumping apparatus. The 342-nm molecular iodine and the 1.315-$\mu$m atomic iodine lasers have been optically pumped by intense light from exploding-metal-film discharges. Brightness temperatures for the exploding-film discharges were approximately 25,000 K. Although lower output energies were achieved for such discharges when compared to exploding-wire techniques, the larger surface area and smaller inductance inherent in the exploding-film should lead to improved efficiency for optically-pumped gas lasers.

12 Claims, 3 Drawing Figures

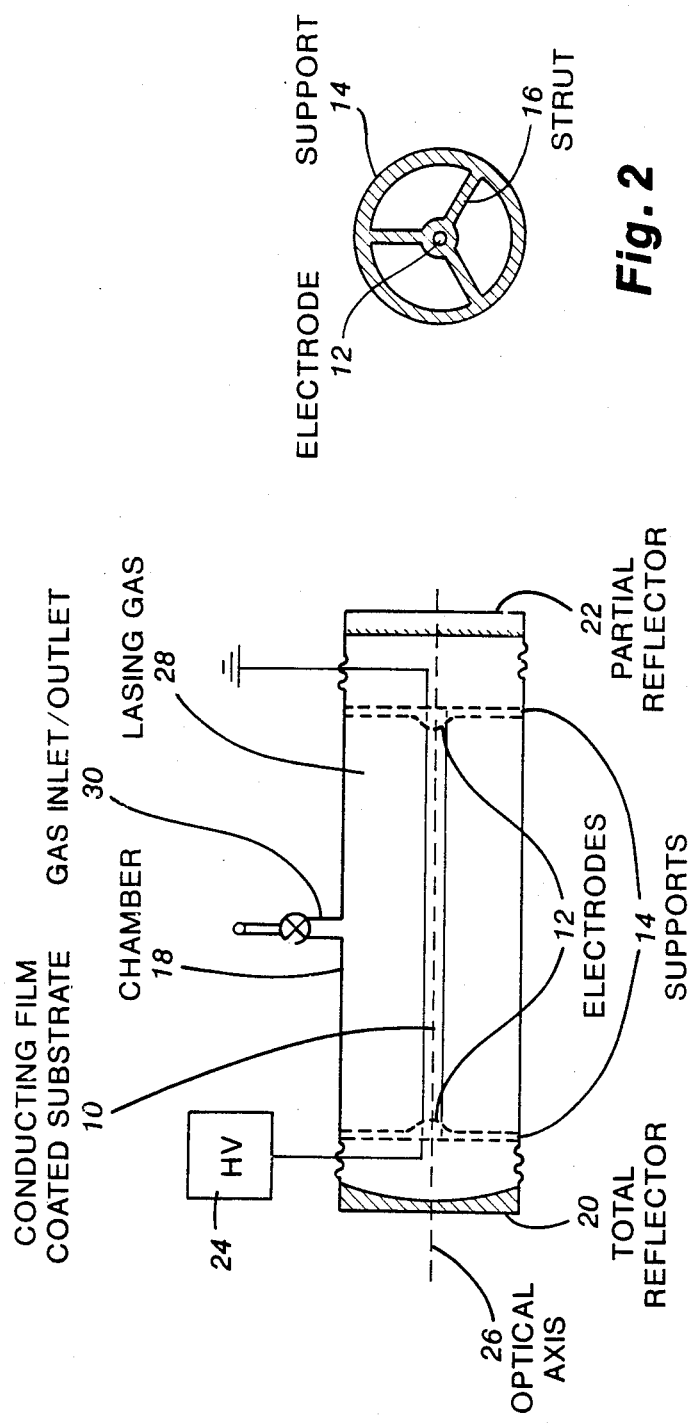

EXPLODING CONDUCTING FILM LASER PUMPING APPARATUS

This invention is the result of a contract with the Department of Energy (Contract No. W-7405-ENG-36).

BACKGROUND OF THE INVENTION

The instant invention relates generally to optically pumped lasers, and more particularly to the use of exploding films for pumping atomic and molecular lasing systems.

Certain lasers can be pumped by a variety of high-intensity light sources, both coherent and noncoherent. Included among the latter sources are xenon flashlamps which have notably long lifetimes, substantial reliability and a good match of their spectral emission with visible or near-ultraviolet bands of many laser media. Brightness temperatures of such sources are typically 6–12 kK and efficiencies for conversion of electrical energy into broadband radiant energy can be as high as 0.8. Other noncoherent sources for optical pumping have been recently introduced. Exploding-wire discharges, surface discharges, ablating-wall flashlamps, plasmadynamic discharges, magnetoplasma compressors and ordinary discharges resulting from a z-pinch have been successfully utilized to pump lasers. The introduction of new laser media and changing requirements for older laser media have precipitated development of, or adaptation of, these newer light sources. Most of the above-mentioned sources have the capability of producing much greater light intensity than xenon flashlamps, especially in the ultraviolet region of the electromagnetic spectrum. This derives from the considerably higher blackbody temperatures of these sources (approximately 30 kK). Lasers requiring excitation in the ultraviolet region of the spectrum especially benefit from the higher brightness temperatures, since the peak emission for a 30 kK blackbody occurs near 100 nm. Many of these sources do not require envelopes, allowing vacuum ultraviolet radiation to be efficiently deposited in the laser medium. Another advantage of these sources, in addition to brightness and spectral content is their shorter pulselengths. This leads to greater peak optical powers than can be delivered by the xenon flashlamps.

Although exploding-wire discharges have been extensively investigated as optical pumping sources for lasers, the use of exploding conducting films or foils has not received attention as an optical pumping technique for any type of laser. The reported temperature range for such discharge sources is between 15 and 40 kK. In "Layered Pulsed Discharge as a Light Source," by I. V. Dvornikov, Yu. N. Kolpakov, V. A. Lakutin, and I. V. Podmoshenskii, translated from Zhurnal Prikladnoi Spektroskopii 21, 227 (1974), in "Structure and Emission of a Stratified Pulsed Discharge," by V.A. Lakutin, V. I. Demidov, I. V. Podmoshenskii, and V. F. Sobolev, Sov. Phys. Tech. Phys. 23, 1020 (1978), in "Stratified Pulsed Discharge with Limited Surface Area," by V. E. Lavrentyuk, V. A. Lakutin, I. V. Podmoshenskii and V. F. Sobolev, Sov. Phys. Tech. Phys. 24, 1186 (1979), in "Microsecond Stratified Pulsed Discharge," by V. A. Lakutin, I. V. Podmoshenskii, Yu. A. Rymarchuk, and V. V. Sudarikov, Sov. Phys. Tech. Phys. 24, 1191 (1979), and in "Initial Stage of a Laminar Pulsed Discharge," by V. A. Lakutin, I. V. Podmoshenskii and V. F. Sobolev, Sov. Phys. Tech. Phys. 25, (1980), details of the characteristics of discharges from exploding metal foils are presented. Mention is made in all of these journal articles that this type of discharge might be used as a source of light, but there is no disclosure as to how such a light source would be applied to the pumping of gas lasers as is taught by the instant invention. Moreover, the above-referenced articles only teach the use of foils and not the use of conducting films as taught in the subject invention. Further, in U.S. Pat. No. 3,646,471 for a "A Cylindrical Array of Exploding Conductors Embedded in a Solid Dielectric for Pumping a Laser," issued to Jack DeMent on Feb. 29, 1972, the inventor discloses an apparatus for providing a multiplicity of light pulses for pumping a laser. The explodable conductors described may include metal foils and films. However, the embodiments described therein and the teachings thereof are directed to the external pumping of gain media as opposed to the placement of the exploding conducting film in the gain medium itself, thereby avoiding transmission difficulties of the short wavelength electromagnetic radiation of interest through window materials.

In "Optically Pumped Ultraviolet and Infrared Lasers Driven by Exploding Metal Films and Wires," by C. R. Jones and K. D. Ware, Proceedings of the Los Alamos Conference an Optics '83, SPIE Volume 380, page 160, published on Nov. 21, 1983, the disclosure of which is hereby incorporated by reference herein, and in "High-Energy Ultraviolet $I_2$ Laser," by C. R. Jones, K. D. Ware and O. F. Swenson, AIP Conference Proceedings, No. 100, Excimer Lasers-1983, page 116, published on June 27, 1983, the disclosure of which is hereby incorporated by reference herein, the use of exploding metal films for pumping molecular and atomic iodine lasers is taught. The subject invention derives in part from the experiments disclosed therein.

SUMMARY OF THE INVENTION

An object of the subject invention is to provide an apparatus for optically pumping gas laser systems.

Another object of the subject invention is to provide an apparatus for optically pumping gas laser systems which has lower inductance and greater surface area than existing exploding wire technology.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the apparatus of this invention includes an elongated electrically insulating substrate onto which is deposited a thin, electrically conducting film, means for providing a pulsed potential difference between the two ends of the film, whereby sufficient electrical current is passed through the film to cause it to vaporize producing thereby an electrical discharge in a gaseous medium suitable for laser oscillation. The discharge generates sufficient noncoherent electromagnetic radiation to optically pump the gaseous medium surrounding it, generating thereby laser oscillation in the medium surrounding the discharge. Means are provided for supporting the laser oscillation and extracting laser radiation generated therefrom. Preferably, the elongated insulating substrate is located substantially parallel to the optical axis of the laser radiation extraction means. Preferably also, the electrically conducting thin film includes deposited metals.

The instant invention then is an apparatus for optically pumping gaseous laser media utilizing exploding metal films for generating intense electromagnetic radiation suitable for generating a population inversion in such media. Similar to exploding wire technology, the exploding metal films of the instant invention are located in the medium itself in order to reduce transmission losses which would occur if window material were used. Unlike the exploding wire, however, the exploding metal films have a much lower inductance and a significantly higher surface area which should lead to higher laser efficiency.

BRIEF DESCRIPTION OF THE DRAWINGS

The accompanying drawings, which are incorporated in and form a part of the specification, illustrate two embodiments of the present invention and, together with the description, serve to explain the principles of the invention. In the drawings:

FIG. 1 is a schematic representation of an apparatus for generating and optically pumping precursors to atomic iodine, generating thereby excited iodine atoms suitable for producing laser oscillation, using the exploding metal film of our invention.

FIG. 2 is a schematic representation of a support member for the metallic exploding film.

DETAILED DESCRIPTION OF THE INVENTION

Figure 3:
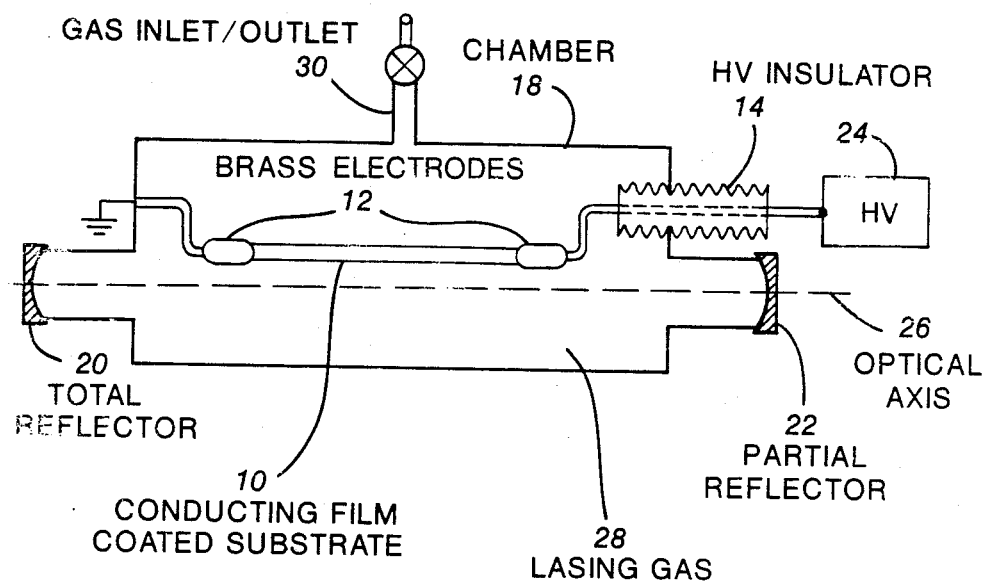
FIG. 3 is a schematic representation of an apparatus for optically pumping molecular iodine using the exploding metal film of our invention.

Reference will now be made in detail to the present preferred embodiments of the invention, which are illustrated in the following examples and in the accompanying drawings.

EXAMPLE I

As a first example of our invention, an exploding cylindrical metal film was used as an optical pump for a photodissociation atomic iodine laser. Light from the film discharge having a central wavelength near 270 nm dissociated a perfluoroalkyl iodide yielding excited iodine atoms and an alkyl radical. Most usually $C_3F_7I$ was used. Laser oscillation from the excited iodine atoms was observed to occur at 1.315 $\mu$m wavelength corresponding to the transition between the $I(5^2P_{1/2})$ level and the $I(5^2P_{3/2})$ level. Turning now to the drawings, FIG. 1 shows a schematic representation of the apparatus used for optically pumping presursors to the atomic iodine, generating thereby excited iodine atoms, using the exploding metal film of the present invention. An approximately 300-Å-thick aluminum film was deposited onto an approximately 33-cm long polyethylene tube 10 having an about 1.3-cm diameter. Each end of the tube was attached to an electrode 12, and the electrode/metal film/substrate combination was supported by two supports 14 which were slidably fitted into a cylindrical nickel-plated aluminum chamber 18, the substrate lying along the axis of the chamber. The ends of the chamber were sealed using mirrors 20, 22 which were polished to better than one-quarter visible wavelength flatness, and separated by about 48 cm. The optical axis of the system 26 was the axis of the chamber. A pyrex "total" reflector 20 was coated for reflectivity in excess of approximately 0.99, while a partial reflector 22 was coated for a reflectivity of about 0.25, both at 1.3 $\mu$m wavelength. The high voltage supply 24 included up to four 10-$\mu$F, 60-kV capacitors. A spark gap switched the 25–50 kV charging voltages typically used. The inductance of the entire discharge circuit was about 1.4 $\mu$H. Lasing gas 28 was introduced into the chamber through gas inlet/outlet 30.

FIG. 2 is a schematic representation of the front view of the film support 14 showing the electrode 12 and struts 16 for supporting the metal film/substrate and the electrodes along the axis of the chamber. Laser oscillation occurred through the open spaces of the supports. The clear aperture was partically blocked by 6–7% due to the struts.

The approximately 1 mg of aluminum was electrically exploded in the first microsecond of a 21-or 23- $\mu$s (half-period) current pulse which peaked at 78 or 135 kA. A 20- or 40-$\mu$F, 1.3-$\mu$H capacitor bank charged to 40 kV provided the source of 16 or 32 kJ of electrical energy. It is believed that less than one kilojoule of energy was actually absorbed by the metal-gas discharge. A first gas mixture comprising 35 torr of $C_3F_7I$, 6 torr of $SF_6$, and 59 torr of Ar was discharged using the 16-kJ source of electrical energy, and 28 torr of $C_3F_7I$, 6 torr of $SF_6$ and 66 torr of Ar was discharged using the 32-kJ source of electrical energy. The gaseous electrical discharge which formed in the latter discharge after the film exploded approximated a blackbody radiating light source with an about 20 kK brightness temperature near 280 nm. The laser pulses were diagnosed by exposure to a 19-cm diameter. 1- or 3-quadrant burn paper which displayed the time-integrated spatial distribution of the pulse, and by exposure to an energy integrating calorimeter in the remaining quadrant to calibrate the total energy in the laser beam. Laser pulses were typically about 4.6-cm i.d. by 8.0-cm o.d. annular rings carrying approximately 0.3 J of energy for the lower-energy discharges, and about 5.5-cm i.d. by 10-cm o.d. annular rings carrying 2.0 J for the higher-energy discharges.

EXAMPLE II

As a second example of the subject invention, an exploding aluminum film was used as an optical pump for a molecular iodine laser. Laser radiation at wavelengths near 342 nm can be generated from molecular iodine when it is pumped by intense electromagnetic radiation having wavelengths in the region of 190 nm. Turning once again to the drawings, FIG. 3 shows a schematic representation of the apparatus used to optically pump molecular iodine. An approximately 1.3-cm diameter acrylic tube 10 served as a substrate for a 1-$\mu$m thick coating of aluminum. It was mounted between two brass electrodes 12 located in a stainless-steel tubular chamber 18. The high voltage electrode of the electrode pair was supported by a high voltage insulator 14. The film-coated substrate 10 is positioned off-axis to the chamber axis and to the optical axis of the optical system 26 as well. It is located at the edge of the 3.5-cm diameter active volume which is defined by the clear aperture of the planar internal mirrors 20, 22. One of the mirrors 22 had a transmittance of about 4.5%, while the other 20 had a transmittance of approximately 1.5%, both at about 352 nm. The energy from a 20-$\mu$F capacitor charged to about 40 kV was applied to the conducting film by a high voltage source 24. Lasing gas 28 was introduced and removed from the chamber through a gas inlet/outlet 30. The $I_2$ pressure was measured with an optical absorption probe. All chamber surfaces and the mirrors were maintained at temperatures between 65 and 75 C. to support the required iodine vapor pressure of a few torr. The cell was filled with about 3 torr of $I_2$ vapor and approximately 2 atm of $SF_6$ buffer gas. The laser output energy was observed using both an energy detector and laser sensitive paper. The measured laser energy was about 0.2 J and had a pulse duration of a few microseconds.

The foregoing description of two embodiments of the invention have been presented for purposes of illustration and description. It is not intended to be exhaustive or to limit the invention to the precise form disclosed, and obviously many modifications and variations are possible in light of the above teaching.

The embodiments were chosen and described in order to best explain the principles of the invention and its practical application to thereby enable other skilled in the art to best utilize the invention in various embodiments and with various modifications as are suited to the particular use contemplated. It is intended that the scope of the invention be defined by the claims appended hereto.

What we claim is:

1. An apparatus for generating intense electromagnetic radiation for producing a population inversion in a gaseous medium suitable for laser oscillation and amplification, said apparatus comprising in combination:
   a. an elongated electrically insulating substrate onto which is deposited a thin, electrically conducting film, said elongated substrate having a first end and a second end;
   b. means for providing a pulsed potential difference between said first end and said second end, whereby sufficient electrical current is passed through said electrically conducting film to cause it to vaporize producing thereby an electical discharge in the gaseous medium, said discharge generating the intense electromagnetic radiation suitable for producing the population inversion suitable for laser oscillation and amplification therein; and
   c. means for supporting the laser oscillation arising from the population inversion and for extracting laser radiation produced therefrom, said means having an optical axis.

2. The apparatus as described in claim 1, wherein said elongated electrically insulating substrate is located substantially parallel to said optical axis.

3. The apparatus as described in claim 2, wherein said electrically conducting thin film includes deposited aluminum.

4. An apparatus for generating laser radiation from atomic iodine which comprises in combination:
   a. an elongated electrically insulating substrate onto which is deposited a thin, electrically conducting film, said elongated substrate having a first end and a second end;
   b. a gas capable of generating atomic iodine when photolyzed, and for supporting a population inversion in said atomic iodine suitable for laser oscillation;
   c. means for providing a pulsed potential difference between said first end and said second end, whereby sufficient electrical current is passed through said electrically conducting film to cause it to vaporize producing thereby an electrical discharge in said gas, said discharge generating intense electromagnetic radiation suitable for photolyzing said gas and for producing a population inversion suitable for laser oscillation and amplification in said atomic iodine generated therein; and
   d. means for supporting the laser oscillation arising from the population inversion and for extracting laser radiation produced therefrom, said means having an optical axis.

5. The apparatus as described in claim 4, wherein said elongated electrically insulating substrate is located substantially parallel to said optical axis.

6. The apparatus as described in claim 5, wherein said electrically conducting thin film includes deposited aluminum.

7. The apparatus as described in claim 6, wherein said gas includes $C_3F_7I$.

8. The apparatus as described in claim 7, wherein said gas further includes at least one buffer gas selected from the group consisting of sulfur hexafluoride, carbon dioxide, carbon tetrafluoride and argon.

9. An apparatus for generating laser radiation in molecular iodine which comprises in combination:
   a. an elongated electrically insulating substrate onto which is deposited a thin, electrically conducting film, said elongated substrate having a first end and a second end;
   b. a gas containing molecular iodine, said gas being capable of supporting a population inversion suitable for laser oscillation and amplification in said molecular iodine when said molecular iodine is excited by electromagnetic radiation having sufficient intensity;
   c. means for providing a pulsed potential difference between said first end and said second end, whereby sufficient electrical current is passed through said electrically conducting film to cause it to vaporize producing thereby an electrical discharge in said gas, said discharge generating electromagnetic radiation of sufficient intensity for producing said population inversion suitable for laser oscillation and amplification in said molecular iodine; and
   d. means for supporting the laser oscillation arising from the population inversion and for extracting laser radiation produced therefrom, said means having an optical axis.

10. The apparatus as described in claim 9, wherein said elongated electrically insulating substrate is located substantially parallel to said optical axis.

11. The apparatus as described in claim 10, wherein said electrically conducting thin film includes deposited aluminum.

12. The apparatus as described in claim 11, wherein said gas further includes at least one buffer gas selected from the group consisting of sulfur hexafluoride, carbon tetrafluoride and argon.

* * * * *